US006998631B2

United States Patent
Hirt et al.

(10) Patent No.: US 6,998,631 B2
(45) Date of Patent: Feb. 14, 2006

(54) DUAL-HEADED, ADJUSTABLE OPTOELECTRONIC IMAGE READER

(75) Inventors: Guenter Hirt, Steinach (DE); Matthias Opfolter, Erbach (DE)

(73) Assignee: Sick AG, Waldkirch (DE)

( * ) Notice: Subject to any disclaimer, the term of this patent is extended or adjusted under 35 U.S.C. 154(b) by 7 days.

(21) Appl. No.: 10/785,385

(22) Filed: Feb. 23, 2004

(65) Prior Publication Data

US 2004/0217308 A1 Nov. 4, 2004

(30) Foreign Application Priority Data

Feb. 24, 2003 (DE) ................................ 103 07 965

(51) Int. Cl.
*G01H 9/00* (2006.01)

(52) U.S. Cl. .............................. 250/559.44; 250/231.13

(58) Field of Classification Search ...............................
250/231.13–231.18, 559.44–559.55, 559.03
See application file for complete search history.

(56) References Cited

U.S. PATENT DOCUMENTS

| 2,952,008 | A |   | 9/1960 | Mitchell |   |
|---|---|---|---|---|---|
| 5,001,931 | A | * | 3/1991 | Nishimoto | .................... 73/587 |
| 5,253,531 | A | * | 10/1993 | Walker | ......................... 73/650 |
| 5,606,173 | A | * | 2/1997 | Concannon | ............... 250/559.3 |
| 6,450,044 | B1 | * | 9/2002 | Eisenhauer | ............ 73/862.193 |
| 6,901,815 | B2 | * | 6/2005 | Torre | ....................... 73/862.29 |

FOREIGN PATENT DOCUMENTS

| DE | 2630209 A | 1/1978 |
|---|---|---|
| DE | 2658659 A | 6/1978 |
| DE | 2731914 A | 1/1979 |
| DE | 19924750 A1 | 10/2000 |

* cited by examiner

*Primary Examiner*—David Porta
*Assistant Examiner*—Tony Ko
(74) *Attorney, Agent, or Firm*—Townsend and Townsend and Crew LLP

(57) ABSTRACT

An optoelectronic sensing device detects two contrasting marks arranged next to each other along two reading tracks on a moving web. An optical head is arranged above each reading track. Each head has a lighting source and a lens, by means of which the contrast marks are imaged on an associated light receiver. Information from the contrast mark is obtained from the output signal of the light receiver. An adjustable connector joins two substantially identical optical heads to each other so that their respective lenses are arranged asymmetrically in the associated optical head and are situated in immediate proximity to each other, which permits adjustment of the device for the smallest possible track spacings.

10 Claims, 2 Drawing Sheets

DUAL-HEADED, ADJUSTABLE OPTOELECTRONIC IMAGE READER

BACKGROUND OF THE INVENTION

The invention concerns an optoelectronic sensing device for the contactless detection of contrasting marks (also referred to as "contrast marks").

For simple tasks, such optoelectronic sensing devices are known as one-track systems for identification of contrast marks.

For more complex tasks, however, contrast marks must be arranged on two adjacent reading tracks.

With the contactless detection or identification of such contrast marks, it is possible to obtain the most diverse information concerning the carrier material for the marks. Depending on the shape, geometry and/or color of the marks, for example, one can determine the exact position, the speed and/or the direction of movement of the carrier material for the marks.

Contrast marks are used, for example, to control multi-color printing machines, in which individual partial color images must be precisely aligned on top of each other. In such an application, the exact orientation is attained by printing a first contrast mark along with the first partial color image. Additional contrast marks are printed with the subsequent partial color image, so that the contrast marks that are to be compared will be situated next to each other along two reading tracks. By optoelectronically sensing the carrier material, the position and movement direction of the first printed contrast mark are then compared with the subsequently printed contrast marks. If a shift in the position of these contrast marks is observed, the phase position of the individual printing cylinder is adjusted, for example with suitable servomechanisms, so that the contrast marks and therewith also the individual partial color images are positioned with respect to each other within a permitted tolerance range.

Another application for such optoelectronic sensing devices is in the area of industrial packaging, which encompasses, for example, the simple packaging of foodstuffs as well as the production (printing, cutting out, punching, folding) of high-quality packaging materials. In order to automate these processes, knowledge of the exact position of the packaging material in the processing machinery is required. Contrast marks applied to the packaging material are used for retrieving the needed information.

A further field for the application of optoelectronic sensing devices is in the field of modern transport and conveying equipment and logistics for the handling of goods of all kinds. For such systems, identifying the instantaneous position of an object is often not sufficient and other information such as, for example, a characteristic of the object or its further transportation path may be needed.

Optoelectronic sensing devices are known which can accomplish a contactless detection of contrasting marks arranged next to each other along two reading tracks on a moving web. In these known arrangements, one or two light sources and at least two light receivers are located in a common housing. Behind a common light exit opening in the common housing are two lenses which direct the emerging light onto the contrasting marks. Light is reflected by the marks, or the carrier material for the marks is then directed back to the associated light receiver. Such known optoelectronic sensing devices for two-track systems have two light sensing inserts, which are installed in a common housing in a fixed and unvariable relationship with respect to each other.

It is likewise known to mount two individual self-contained one-track light sensors next to each other and to process the two individual output signals in a common evaluating circuit so as to form composite information from the contrast marks on two reading tracks.

A drawback with the prior art is that when the two light sensing systems are fixedly arranged in a common housing, the distance between the two reading tracks is also fixed and invariable. This limits the possible configurations the contrast marks may take and/or the carrier material for these contrast marks may have.

The solution employing two individual self-contained light sensors in two separate housings that are adjustable to conform to the track spacing has the drawback that it requires a minimum track spacing because the two individual housings are relatively large. The area occupied by the contrast marks must be large. This is particularly troublesome because, in addition to the contrast marks, other symbols or representations are typically present on the carrier material, which can result in an undesirably large information density on the carrier material.

Thus, there is a need for an optoelectronic sensing device for detecting contrast marks on two adjacent reading tracks which is easily adapted for use with different reading track spacings. Such sensing devices should be dimensioned such that even very small track spacings can be accommodated.

SUMMARY OF THE INVENTION

To solve this problem the present invention combines two largely identical optical heads with an adjustable connector or connection arrangement into an optoelectronic sensing device. Each optical head possesses a lighting source, a lens and a coordinated light receiver. The lens is arranged symmetrically to the connection arrangement and in immediate proximity to one wall of the housing of the associated optical head. A component of the connection arrangement carried by the optical head is configured so that the optical head can be mounted in two positions that are offset by 180° relative to the optical axis. In this manner, two identical optical heads can be joined via the connection arrangement so that the two lenses are located in immediate proximity to each other. This allows the reading of contrast marks along even closely adjacent tracks.

An advantage of the present invention is that the special configuration of the optical heads, in conjunction with the connection arrangement, creates a sensing device that is highly adjustable in terms of the track spacing. Since the invention uses two substantially identical optical heads and an advantageously configured connection arrangement, it also provides significant economic benefits.

A further advantage of the present invention is that the two optical heads are constructed so that they are in communication with each other, which considerably simplifies the wiring tasks during assembly.

In a further modification of the invention, the two optical heads communicate with each other via electrical contact surfaces.

If the possible range of the track spacing changes is relatively large so that there can be a substantial air space between the optical heads, the communication between the two heads takes place as an optical, inductive or magnetic data transmission.

In one advantageous embodiment of the connection arrangement of the present invention, the two optical heads have at least two complementary boreholes which extend through the housing and are configured to accurately receive an assembly rod connecting the two optical heads. The optical heads can be shifted along the assembly rod and, after the desired track spacing has been set, they are secured in the desired relative positions, for example, with a clamping screw.

Another aspect of the invention configures the side of the housing facing the moving web with the reading tracks where the two optical heads are located so that little or no turbulence is formed as the web of material moves past it.

In a further modification of the invention, the lenses of the optical heads are protected against damaging mechanical influences with a hard closure disk arranged in the housing.

DESCRIPTION OF THE PREFERRED EMBODIMENTS

Figure 1:
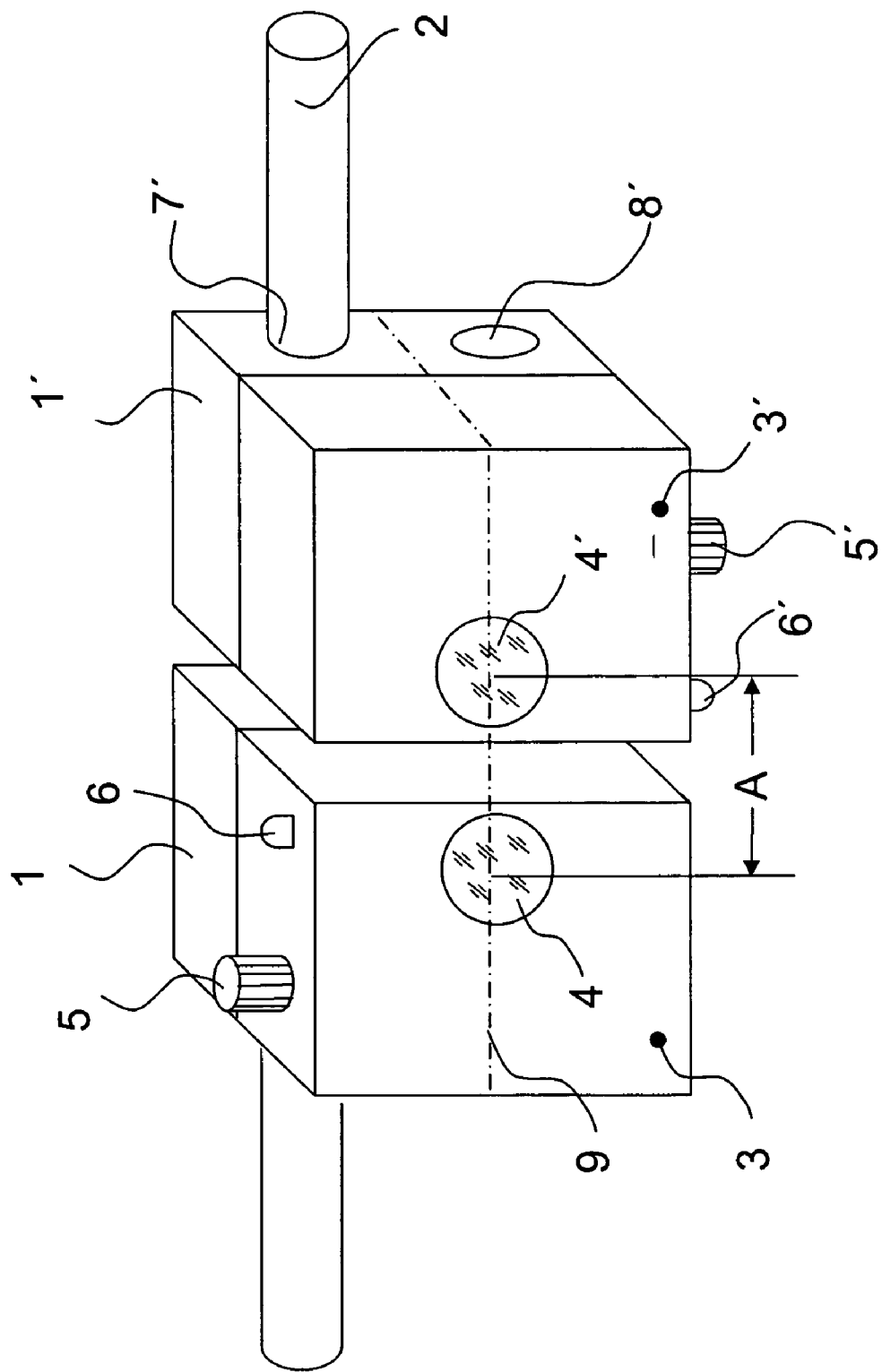
FIG. 1 is a schematic view of an optoelectronic sensing device which is set for a mean track spacing.

Referring to FIG. 1, two substantially identical optical heads 1 and 1' are joined by an assembly rod 2. The optical heads 1, 1' are in a housing, having a front surface 3, 3' carrying a lens 4, 4', asymmetrically shifted in a lengthwise direction of assembly rod 2. Optical head 1' is rotated by 180° in the direction of the optical axis of the lens 4' so that the lenses are closely adjacent to each other as is seen in FIG. 1. On the top side of the optical head 1 and on the bottom side of the optical head 1' is an operator element 5, 5' as well as a display bulb or light 6, 6'. In the rear area of the optical heads 1, 1', an adjustable connector for the heads is provided. In the preferred embodiment, the connector is defined by two continuous boreholes 7' and 8' formed in a rear portion of the housing (boreholes in head 1 not shown) and they extend in the direction of the lengthwise axis of and slidably engage assembly rod 2. Since the two boreholes 7' and 8' are symmetric relative to lenses 4, 4', the lenses lie on a line 9 which extends parallel to the axis of assembly rod 2, despite the fact that the optical head 1' is rotated by 180° relative to the optical head 1. Since optical heads 1 and 1' can be shifted along the assembly rod 2, the center-to-center spacing "A" between the lenses 4, 4' can be freely adjusted and changed.

Figure 2:
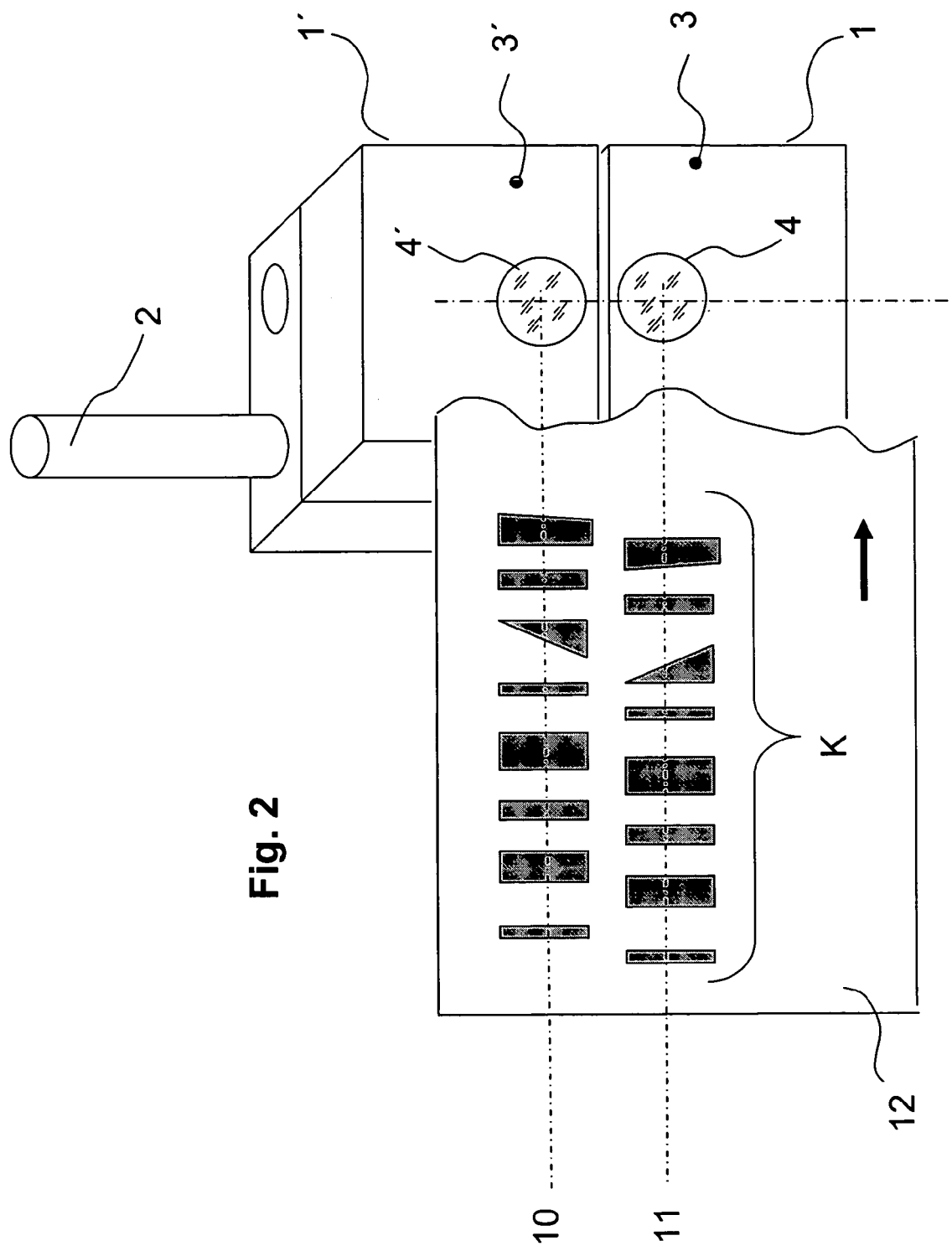
FIG. 2 is a schematic view of an optoelectronic sensing device with a carrier material having contrast markings along two reading tracks.

Referring to FIG. 2, the two optical heads 1 and 1' have been shifted along assembly rod 2 so that the optical axes of lenses 4, 4' coincide with the two reading tracks 10 and 11 on a carrier material 12. The individual contrasting marks "K" are identified on the basis of their different reflectance as compared to the carrier material 12 as the latter moves past optical heads 1 and 1'.

Since the distance between housing front surfaces 3, 3' and the carrier material 12 is typically only a few mm and the speed of the carrier material 12 may be very high, it is important to give the front surfaces 3, 3' a contour and shape that prevents turbulence in the gap between the carrier material and the optoelectronic sensing device. This can be attained with one or more of providing a pronounced rounding/beveling of at least those leading and trailing edges of the optical heads which face the carrier material 12, or configuring the surface contour as a truncated pyramid, with lenses 4, 4' being positioned on the cover surface of the truncated pyramid.

To avoid an external electrical connection between the two optical heads 1 and 1', spring-biased contact pins for the exchange of data can be provided at the inner surfaces of the optical heads facing each other. As an alternative, the data exchange can also take place in the form of an optical, inductive or magnetic data transmission between the two optical heads 1 and 1'.

What is claimed is:

1. An optoelectronic sensing device for detecting first and second contrast marks arranged next to each other along first and second reading tracks moving in a transport direction comprising first and second substantially identical optical heads for placement above the reading tracks, each head including a lighting source and a lens for imaging the contrast marks on an associated light receiver which generates an output signal having information obtained from the contrast marks, and a connector joining the first and second optical heads so that the lenses are arranged asymmetrically in the respective optical heads and in immediate proximity to each other for providing a smallest possible, adjustable spacing between the lenses.

2. An optoelectronic sensing device according to claim 1, including an arrangement establishing communication between the first and second optical heads.

3. An optoelectronic sensing device according to claim 2, wherein the arrangement establishing communication comprises electrical contact surfaces.

4. An optoelectronic sensing device according to claim 3, wherein the arrangement establishing the communication comprises one of an optical, inductive and magnetic data transmission.

5. An optoelectronic sensing device according to claim 1, wherein the connector comprises at least one assembly rod and wherein the first and second optical heads have at least two complementary boreholes for receiving the assembly rod.

6. An optoelectronic sensing device according to claim 1, wherein each optical head includes a housing with a side facing the reading tracks, the sides being configured to substantially prevent the formation of air turbulence as the reading tracks move relative to the optical heads.

7. An optoelectronic sensing device according to claim 1, including a hard closure disk arranged in the housing and protecting the lenses of the optical heads against harmful mechanical effects.

8. An optoelectronic sensing device according to claim 1, including a web which carries the contrast markings.

9. An optoelectronic sensing device for detecting first and second contrast marks arranged on a common surface next to each other along first and second reading tracks moving in a transport direction comprising first and second substantially identical optical heads for placement above the reading tracks, each head including a lighting source and a lens for imaging the contrast marks on an associated light receiver which generates an output signal having information obtained from the contrast marks, and a connector joining the first and second-optical heads so that the lenses face the common surface, are arranged asymmetrically in the respective optical heads and are in proximity to each other for providing a small, adjustable spacing between the lenses.

10. An optoelectronic sensing device for detecting first and second contrast marks arranged next to each other along first and second reading tracks moving in and spaced apart transversely to a transport direction comprising first and second substantially identical optical heads for placement above the reading tracks, each head including a lighting source and a lens for imaging the contrast marks on an associated light receiver which generates an output signal having information obtained from the contrast marks, and a connector joining the first and second optical heads so that the lenses are arranged asymmetrically in the respective optical heads, face in a common direction, and are proximate and can be moved relative to each other transversely to the transport direction for adjusting a spacing between the lenses according to the spacing between the reading tracks.

* * * * *